US010223933B1

(12) United States Patent
Cheng et al.

(10) Patent No.: US 10,223,933 B1
(45) Date of Patent: Mar. 5, 2019

(54) MULTIZONE COOKING UTILIZING A SPECTRAL-CONFIGURABLE COOKING INSTRUMENT

(71) Applicant: Brava Home, Inc., Union City, CA (US)

(72) Inventors: Shih-Yu Cheng, Union City, CA (US); Dan Yue, Palo Alto, CA (US); Richard Metzler, San Antonio, TX (US); Mark Janoff, Redwood City, CA (US)

(73) Assignee: BRAVA HOME, INC., Redwood City, CA (US)

( * ) Notice: Subject to any disclaimer, the term of this patent is extended or adjusted under 35 U.S.C. 154(b) by 0 days.

(21) Appl. No.: 15/673,296

(22) Filed: Aug. 9, 2017

(51) Int. Cl.
| | |
|---|---|
| A21B 2/00 | (2006.01) |
| B65B 1/04 | (2006.01) |
| G09B 19/00 | (2006.01) |
| G09B 5/02 | (2006.01) |
| A47J 36/02 | (2006.01) |
| A47J 36/04 | (2006.01) |
| B65D 65/42 | (2006.01) |
| A47J 37/01 | (2006.01) |
| B65D 65/20 | (2006.01) |
| B65B 25/22 | (2006.01) |
| B65D 81/34 | (2006.01) |

(52) U.S. Cl.
CPC ......... *G09B 19/0092* (2013.01); *A47J 36/02* (2013.01); *A47J 36/04* (2013.01); *A47J 37/01* (2013.01); *B65B 25/22* (2013.01); *B65D 65/20* (2013.01); *B65D 65/42* (2013.01); *B65D 81/343* (2013.01); *G09B 5/02* (2013.01)

(58) Field of Classification Search
None
See application file for complete search history.

(56) References Cited

U.S. PATENT DOCUMENTS

| | | | |
|---|---|---|---|
| 3,407,285 | A | 10/1968 | Jacobs |
| 4,475,024 | A | 10/1984 | Tateda et al. |
| | | (Continued) | |

FOREIGN PATENT DOCUMENTS

| | | |
|---|---|---|
| CN | 101398197 A | 4/2009 |
| RU | 2006102663 A | 8/2007 |
| | (Continued) | |

OTHER PUBLICATIONS

International Search Report and Written Opinion for International Application No. PCT/US2016/051142 dated Jan. 12, 2017, 5 pages.

*Primary Examiner* — Joseph M Pelham
(74) *Attorney, Agent, or Firm* — Haynes and Boone, LLP

(57) ABSTRACT

Several embodiments include a cooking instrument. The cooking instrument can select a food cooking recipe and identify relative areas in a cooking chamber to place at least two portions of food. The relative areas would match the food cooking recipe. The cooking instrument can display information associated with an instruction to place the at least two portions of food over the relative areas. The cooking instrument can then determine a heating sequence in accordance with the food cooking recipe and control, based on the heating sequence, a heating system to directionally transfer heat under different heating characteristics respectively to the at least two portions of the food at the identified relative areas in the cooking chamber.

22 Claims, 10 Drawing Sheets

(56) References Cited

U.S. PATENT DOCUMENTS

| | | | |
|---|---|---|---|
| 4,771,154 A | | 9/1988 | Bell et al. |
| 4,800,090 A | | 1/1989 | August |
| 5,665,259 A | * | 9/1997 | Westerberg ............. A47J 27/62 |
| | | | 219/405 |
| 5,990,454 A | * | 11/1999 | Westerberg .......... H05B 3/0076 |
| | | | 219/411 |
| 6,011,242 A | * | 1/2000 | Westerberg ............. A47J 27/62 |
| | | | 219/411 |
| 6,013,900 A | * | 1/2000 | Westerberg .......... H05B 3/0076 |
| | | | 219/405 |
| 6,069,345 A | * | 5/2000 | Westerberg ......... A47J 37/0623 |
| | | | 219/411 |
| 6,302,095 B1 | | 10/2001 | Tolley et al. |
| 6,417,494 B1 | * | 7/2002 | Westerberg .......... H05B 3/0076 |
| | | | 219/402 |
| 6,843,207 B2 | | 1/2005 | Kanzaki et al. |
| 7,075,442 B2 | | 7/2006 | Lion et al. |
| D541,578 S | | 5/2007 | Jeon |
| 7,323,663 B2 | | 1/2008 | Cavada et al. |
| D586,180 S | | 2/2009 | Pino et al. |
| D602,306 S | | 10/2009 | Lavy |
| 7,619,186 B2 | | 11/2009 | Cavada et al. |
| 7,683,292 B2 | | 3/2010 | Cavada et al. |
| D629,639 S | | 12/2010 | Fernandez et al. |
| 8,791,398 B2 | | 7/2014 | De la Cuerda Ortin et al. |
| 8,929,724 B1 | * | 1/2015 | Mograbi ................. A21B 2/00 |
| | | | 219/405 |
| 9,414,444 B2 | | 8/2016 | Libman et al. |
| D771,995 S | | 11/2016 | Bhogal et al. |
| D771,996 S | | 11/2016 | Bhogal et al. |
| D777,504 S | | 1/2017 | Bhogal et al. |
| D782,864 S | | 4/2017 | Bhogal et al. |
| D783,336 S | | 4/2017 | Suh et al. |
| D802,996 S | | 11/2017 | Bhogal et al. |
| 2002/0171674 A1 | | 11/2002 | Paris |
| 2005/0173400 A1 | * | 8/2005 | Cavada .................... F24C 7/04 |
| | | | 219/411 |
| 2008/0259995 A1 | | 10/2008 | Kuhn et al. |
| 2009/0034944 A1 | | 2/2009 | Burtea et al. |
| 2009/0102083 A1 | * | 4/2009 | Cochran ............... B29B 13/023 |
| | | | 264/40.6 |
| 2009/0272814 A1 | | 11/2009 | Granhed et al. |
| 2010/0199857 A1 | | 8/2010 | Storiz et al. |
| 2011/0002675 A1 | * | 1/2011 | Cochran .................. A47J 37/00 |
| | | | 392/411 |
| 2011/0002677 A1 | * | 1/2011 | Cochran ............... H05B 3/0057 |
| | | | 392/416 |
| 2012/0063753 A1 | * | 3/2012 | Cochran .................. A47J 36/02 |
| | | | 392/416 |
| 2012/0180775 A1 | | 7/2012 | Waltz et al. |
| 2013/0202754 A1 | * | 8/2013 | Cochran .................. A47J 36/02 |
| | | | 426/383 |
| 2017/0074522 A1 | | 3/2017 | Cheng et al. |
| 2017/0211819 A1 | | 7/2017 | McKee et al. |
| 2017/0215233 A1 | * | 7/2017 | Katz .................... H05B 3/0076 |

FOREIGN PATENT DOCUMENTS

| | | |
|---|---|---|
| RU | 2007111953 A | 10/2008 |
| RU | 2008111110 A | 9/2009 |
| RU | 110892 U1 | 11/2011 |
| WO | 1998030941 A1 | 7/1998 |
| WO | WO 1998/030941 A1 | 7/1998 |

\* cited by examiner

MULTIZONE COOKING UTILIZING A SPECTRAL-CONFIGURABLE COOKING INSTRUMENT

TECHNICAL FIELD

Various embodiments relate to cooking instruments, such as ovens.

BACKGROUND

The art of cooking remains an "art" at least partially because of the food industry's inability to help cooks to produce systematically award worthy dishes. To make a full course meal, a cook often has to use multiple cooking instruments, understand the heating patterns of the cooking instruments, and make dynamic decisions throughout the entire cooking process based on the cook's observation of the target food's progression (e.g., transformation due to cooking/heating). Because of this, while some low-end meals can be microwaved (e.g., microwavable meals) or quickly produced (e.g., instant noodles), traditionally, truly complex meals (e.g., steak, kebabs, sophisticated dessert, etc.) cannot be produced systematically using conventional cooking instruments automatically. The industry has yet been able to create an intelligent cooking instrument capable of automatically and consistently producing complex meals with precision, speed, and lack of unnecessary human intervention.

Figure 1:
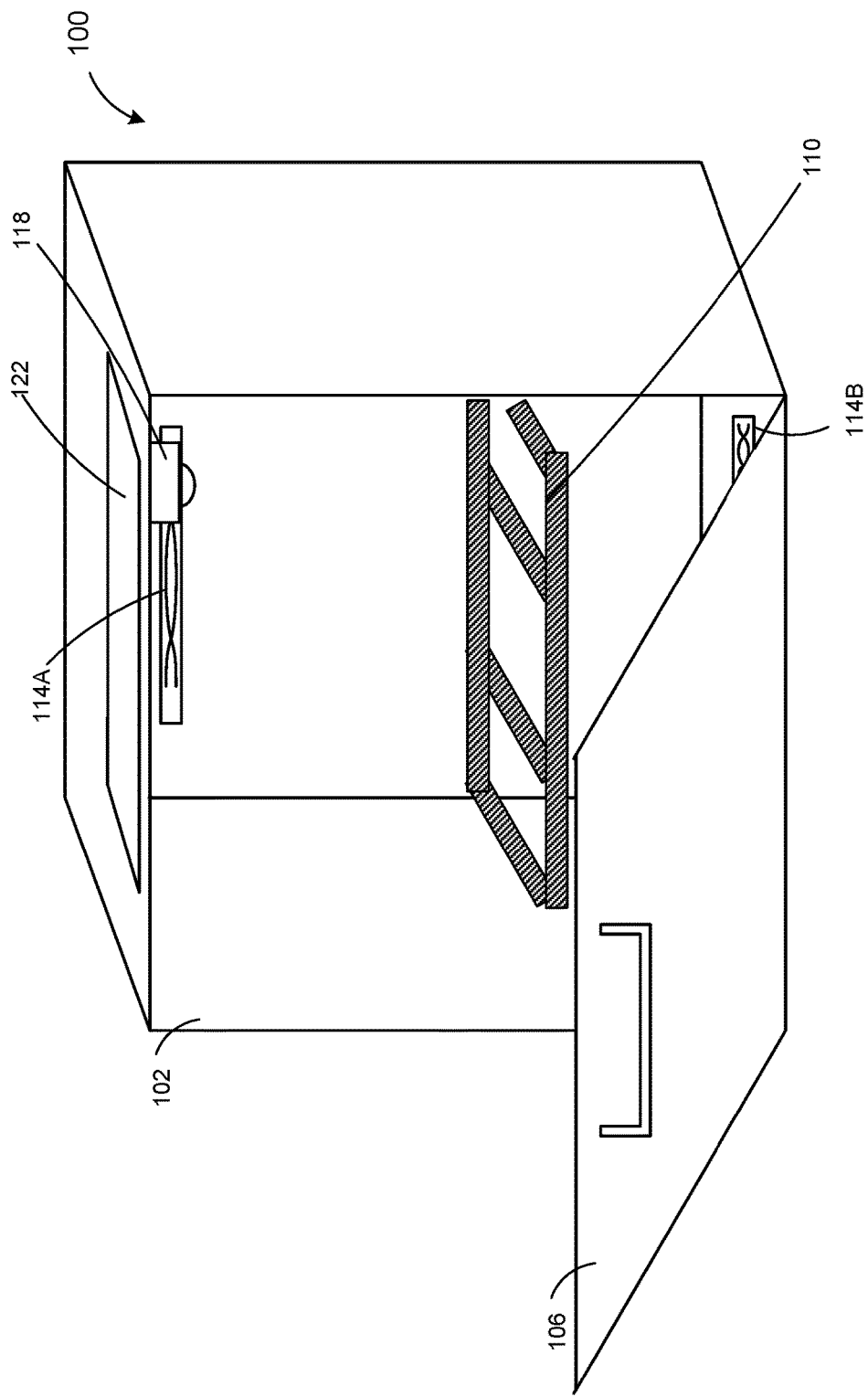
FIG. 1 is a structural diagram of a perspective view of a cooking instrument, in accordance with various embodiments.

The figures depict various embodiments of this disclosure for purposes of illustration only. One skilled in the art will readily recognize from the following discussion that alternative embodiments of the structures and methods illustrated herein may be employed without departing from the principles of embodiments described herein.

DETAILED DESCRIPTION

A conventional oven cooks food within its chamber utilizing a single setting over a period of time. Cooking a complex dish (e.g., having multiple components) with such oven is either restricted by how well cooked all of the components together as a whole is or requires that only a subset of components be cooked at one time in the oven. Disclosed is a cooking instrument capable of implementing multiple cooking zones in its cooking chamber, each cooking zone capable of applying a different heating sequence.

A heating sequence can be the basis for configuring a heating system of various embodiments of the disclosed cooking instrument. In various embodiments, the cooking instrument can implement a heating sequence for each cooking zone. The heating sequences of the cooking zones can be simultaneously applied, fully or partially interleaved, and/or sequentially applied one after another. For example, a heating sequence can include one or more segments, each segment under a different heating system setting. Subsets of these segments may also be referred to as a heating sequence. Each heating system setting can apply to one or more selected heating elements in the heating system. Each heating system setting includes one or more parameters to configure the selected one or more heating elements. In some embodiments, a heating sequence can be defined by dynamically evolving segments, each segment dynamically determined based on sensors and/or user feedback. In some embodiments, a heating sequence can be defined by a static sequence of segments, each segment having a static heating system setting. In some embodiments, a heating sequence includes one or more dynamically evolving segments and one or more static segments.

In some embodiments, a cooking instrument selects a food cooking recipe to drive a heating system of the cooking instrument. The selection can be made based on a user indication, an external message, a sensor input, or any combination thereof. The cooking instrument can receive the user indication via a touch screen of the cooking instrument, a message from a device in network communication with the cooking instrument, or a camera identifying an optical label or a type of food based on user placement.

The cooking instrument can identify relative areas in a cooking chamber to place at least two portions of food. The relative areas are associated with the selected food cooking recipe. In some implementations, the cooking instrument identifies the relative areas based on the selected food cooking recipe. In some implementations, the cooking instrument selects the food cooking recipe after identifying the relative areas for placing the at least two portions of food. In some cases, the food cooking recipe can be selected after the at least two portions of food is placed and the type and amount of the at least two portions of food are identified. That is, regardless of the order of identifying the relative areas and selection of the food cooking recipe, the placement of the portions of food have to match the food cooking recipe.

The cooking instrument can display information associated with an instruction to place the at least two portions of food over the relative areas. In one example, the information includes directly displaying the instruction showing the respective identifiers over the representations of the relative areas. In another example, the information includes a reference to where (e.g., a paper copy of the instruction) to obtain such instruction.

The cooking instrument can determine a heating sequence in accordance with the food cooking recipe. Heating sequences are the basis for driving the heating system and its one or more heating elements. A heating sequence can be defined by the selection of the one or more heating elements and one or more segments, each segment for configuring the selected heating elements under a plurality of parameters. For example, the cooking instrument can control, based on the heating sequence, the heating system such that the heating system directionally transfers heat under different heating characteristics respectively to the at least two portions of the food at the identified relative areas in the cooking chamber.

In some embodiments, the cooking instrument is configured to detect incorrect placement of the portions of food (e.g., utilizing a camera and image analysis). In response to detecting the incorrect placement, the cooking instrument can reselect a food cooking recipe, regenerate the heating sequence, or instruct the user to relocate the portions of food.

FIG. 1 is a structural diagram of a perspective view of a cooking instrument 100, in accordance with various embodiments. The cooking instrument 100 can include a chamber 102 having a door 106. At least one cooking platform 110 is disposed inside the chamber 102. The cooking platform 110 can be a tray, a rack, or any combination thereof.

The cooking instrument 100 can include a heating system (not labeled in FIG. 1). The heating system can include one or more heating elements 114 (e.g., a heating element 114A, a heating element 114B, etc., collectively as the "heating elements 114"). The chamber 102 can be lined with the heating elements 114. Each of heating elements 114 can include a wavelength controllable filament assembly. The wavelength controllable filament assembly is capable of independently adjusting an emission spectral power distribution (hence also peak frequency and peak wavelength), emission power, and/or emission signal pattern in response to a command from a computing device (not shown) of the cooking instrument 100.

In several embodiments, the chamber 102 is windowless. That is, the chamber 102, including the door 106, is entirely enclosed without any transparent (and/or semitransparent) parts when the door 106 is closed. For example, the chamber 102 can be sealed within a metal enclosure (e.g., with thermal insulation from/to the outside of the chamber 102) when the door 106 is closed. A camera 118 can be attached to an interior of the chamber 102. In some embodiments, the camera 118 is attached to the door 106. For example, the camera 118 can face inward toward the interior of the chamber 102 when the door 106 is closed and upward when the door 106 is opened as illustrated. In some embodiments, the camera 118 is installed on the ceiling (e.g., top interior surface) of the chamber 102. The camera 118 can be attached to the door 106 or proximate (e.g., within three inches) to the door 106 on the ceiling of the chamber 102 to enable easy cleaning, convenient scanning of labels, privacy, heat damage avoidance, etc.

In several embodiments, each of the heating elements 114 includes one or more wavelength-controllable filament assemblies at one or more locations in the chamber. In some embodiments, each of the one or more wavelength-controllable filament assemblies is capable of independently adjusting its emission spectral power distribution (e.g., peak emission frequency) and/or its emission power. For example, the peak emission frequency of the wavelength-controllable filament assemblies can be tuned within a broad band range (e.g. from 20 terahertz to 300 terahertz). Different frequencies can correspond to different penetration depth for heating the food substances, the cooking platform 110 or other items within the chamber 102, and/or parts of the cooking instrument 100.

The heating elements 114 can be controlled to have varying power, either by using a rapidly switching pulse width modulation (PWM)-like electronics by having a relay-like control that turns on and off relatively quickly compared to the thermal inertia of the heating filament itself. The change in peak emission frequency can be directly correlated with the amount of power delivered into the heating element. More power correlates to higher peak emission frequency. In some cases, the cooking instrument 100 can hold the power constant while lowering the peak emission frequency by activating more heating elements, each at a lower power. The cooking instrument 100 can independently control peak emission frequencies of the filament assemblies and power them by driving these filament assemblies individually.

In some embodiments, using the max power for each individual heating element to achieve the highest emission frequency is challenging because the power consumption may be insufficiently supplied by the AC power supply (e.g., because it would trip the fuse). In some embodiments, this is resolved by sequentially driving each individual heating element at maximum power instead of driving them in parallel with reduced power. Intermediate peak emission frequency can be achieved by having a combination of sequential driving and parallel driving.

In some embodiments, the camera 118 includes an infrared sensor to provide thermal images to the computing device as feedback to a dynamic heating sequence (e.g., a heat adjustment algorithm). In some embodiments, the cooking instrument 100 includes multiple cameras. In some embodiments, the camera 118 includes a protective shell. In some embodiments, the heating elements 114 and the camera 118 are disposed in the chamber 102 such that the camera 118 is not directly between any pairing of the heating elements. For example, the heating elements 114 can be disposed along two vertical walls perpendicular to the door 106. The heating elements 114 can be quartz tubes (e.g., with heating filaments therein) that run horizontally on the vertical walls and perpendicular to the door 106.

In some embodiments, a display 122 is attached to the door 106. In some embodiments, the display 122 is attached to an outward-facing surface of the chamber 102 other than the door 106 (as shown). The display 122 can be a touchscreen display. The display 122 can be attached to an exterior of the chamber 102 on an opposite side of the door 106 from the camera 118. The display 122 can be configured to display a real-time image or a real-time video of the interior of the chamber captured by and/or streamed from the camera 118.

Figure 2:
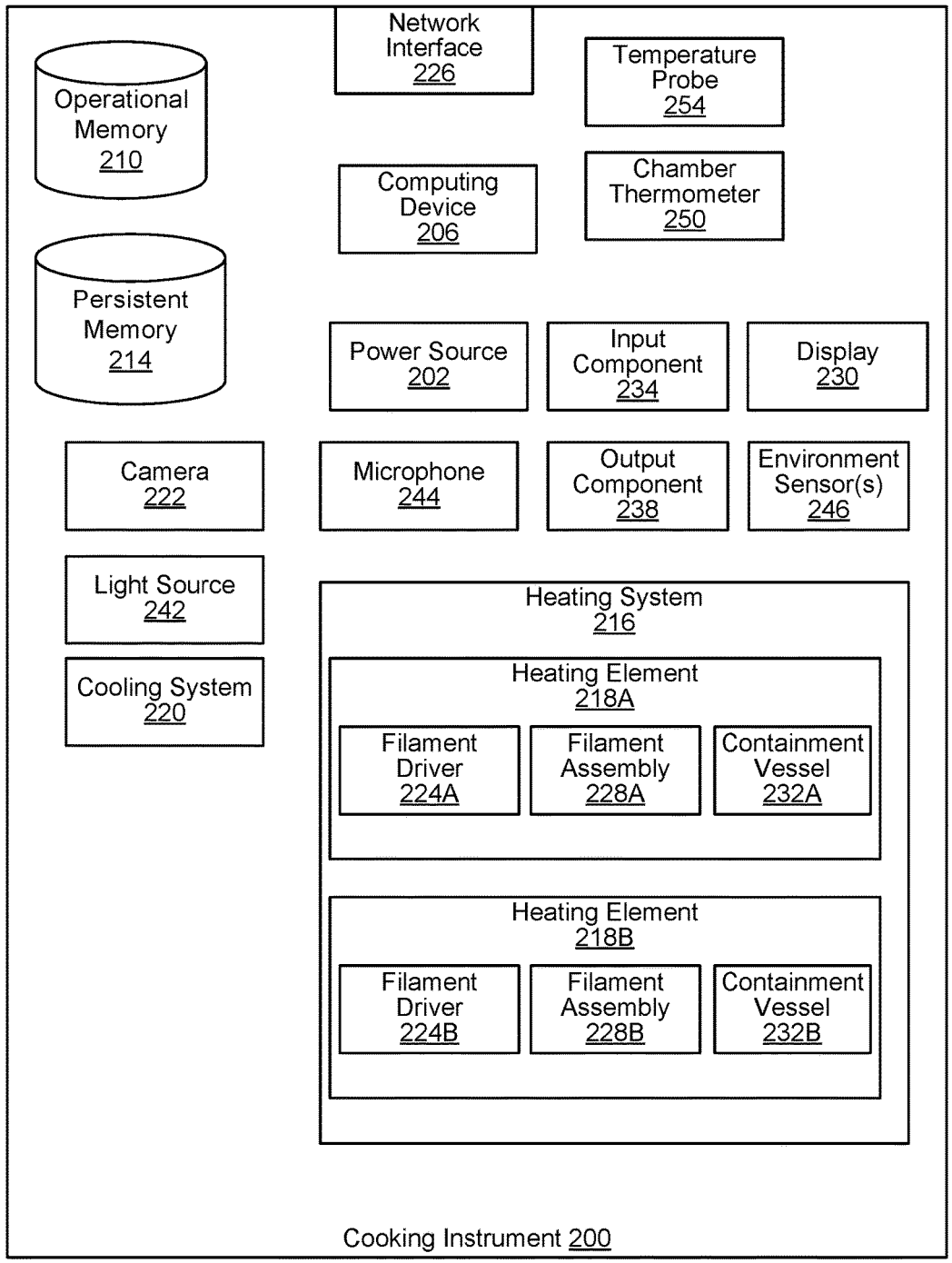
FIG. 2 is a block diagram illustrating physical components of a cooking instrument, in accordance with various embodiments.

FIG. 2 is a block diagram illustrating physical components of a cooking instrument 200 (e.g., the cooking instrument 100), in accordance with various embodiments. The cooking instrument 200 can include a power source 202, a computing device 206, an operational memory 210, a persistent memory 214, a heating system 216 with one or more heating elements (e.g., a heating element 218A, a heating element 218B, etc., collectively as the "heating elements 218"), a cooling system 220, a camera 222 (e.g., the camera 118), a network interface 226, a display 230 (e.g., the display 122), an input component 234, an output component 238, a light source 242, a microphone 244, one or more environment sensors 246, a chamber thermometer 250, a temperature probe 254, or any combination thereof. The heating elements 218 can be the heating elements 114.

The computing device 206, for example, can be a control circuit. The computing device 206 serves as the control system for the cooking instrument 200. The control circuit can be an application-specific integrated circuit or a circuit with a general-purpose processor configured by executable instructions stored in the operational memory 210 and/or the persistent memory 214. The computing device 106 can control all or at least a subset of the physical components and/or functional components of the cooking instrument 200.

The power source 202 provides the power necessary to operate the physical components of the cooking instrument 200. For example, the power source 202 can convert alternating current (AC) power to direct current (DC) power for the physical components. In some embodiments, the power source 202 can run a first powertrain to the heating elements 218 and a second powertrain to the other components. In some cases, the first powertrain is an AC powertrain and the second powertrain is a DC powertrain.

The computing device 206 can control peak wavelengths and/or spectral power distributions (e.g., across different wavelengths) of the heating elements 218. The computing device 206 can implement various functional components (e.g., see FIG. 3) to facilitate operations (e.g., automated or semi-automated operations) of the cooking instrument 200. For example, the persistent memory 214 can store one or more cooking recipes, which are sets of operational instructions and schedules, including heating sequences, to drive the heating elements 218. The operational memory 210 can provide runtime memory to execute the functional components of the computing device 206. In some embodiments, the persistent memory 214 and/or the operational memory 210 can store image files or video files captured by the camera 222.

The heating elements 218 can be wavelength controllable (e.g., capable of changing its spectral power distribution). For example, the heating elements 218 can include quartz tubes, each enclosing one or more heating filaments. In various embodiments, the side of the quartz tubes facing toward the chamber wall instead of the interior of the chamber is coated with a heat resistant coating. However, because the operating temperature of the heating filaments can be extremely high, the cooling system 220 provides convection cooling to prevent the heat resistant coating from melting or vaporizing.

The heating elements 218 can respectively include filament drivers (e.g., respectively a filament driver 224A and a filament driver 224B, collectively as the "filament drivers 224"), filament assemblies (e.g., respectively filament assembly 228A and filament assembly 228B, collectively as the "filament assemblies 228B"), and containment vessels (e.g., respectively containment vessel 232A and containment vessel 232B, collectively as the "containment vessels 232"). For example, each heating element can include a filament assembly housed by a containment vessel. The filament assembly can be driven by a filament driver. In turn, the filament driver can be controlled by the computing device 206. For example, the computing device 206 can instruct the power source 202 to provide a set amount of power to the filament driver. In turn, the computing device 306 can instruct the filament driver to drive the filament assembly to generate electromagnetic waves (i.e., a form of wireless electromagnetic energy) at a set peak wavelength or a particular spectral power distribution.

The camera 222 serves various functions in the operation of the cooking instrument 200. For example, the camera 222 and the display 230 together can provide a virtual window to the inside of the chamber despite the cooking instrument 200 being windowless. The camera 222 can serve as a food package label scanner that configures the cooking instrument 200 by recognizing a machine-readable optical label of the food packages. In some embodiments, the camera 222 can enable the computing device 206 to use optical feedback when executing a cooking recipe. In several embodiments, the light source 242 can illuminate the interior of the cooking instrument 200 such that the camera 222 can clearly capture an image of the food substance therein.

The network interface 226 enables the computing device 206 to communicate with external computing devices. For example, the network interface 226 can enable Wi-Fi or Bluetooth. A user device can connect with the computing device 206 directly via the network interface 226 or indirectly via a router or other network devices. The network interface 226 can connect the computing device 206 to an external device with Internet connection, such as a router or a cellular device. In turn, the computing device 206 can have access to a cloud service over the Internet connection. In some embodiments, the network interface 226 can provide cellular access to the Internet.

The display 230, the input component 234, and the output component 238 enable a user to directly interact with the functional components of the computing device 206. For example, the display 230 can present images from the camera 222. The display 230 can also present a control interface implemented by the computing device 206. The input component 234 can be a touch panel overlaid with the display 230 (e.g., collectively as a touchscreen display). In some embodiments, the input component 234 is one or more mechanical devices (e.g., buttons, dials, switches, or any combination thereof). In some embodiments, the output component 238 is the display 230. In some embodiments, the output component 238 is a speaker or one or more external lights.

In some embodiments, the cooking instrument 200 includes the microphone 244, and/or the one or more environment sensors 246. For example, the computing device 206 can utilize the audio signal, similar to images from the camera 222, from the microphone 244 as dynamic feedback to adjust the controls of the heating elements 218 in real-time according to a heat adjustment algorithm (e.g., a part of a dynamic heating sequence). In one example, the computing device 206 can detect an audio signal indicative of a fire alarm, a smoke alarm, popcorn being popped, or any combination thereof. For example, the computing device 206 can adjust the heating system 216 according to the detected audio signal, such as turning off the heating elements 218 in response to detecting an alarm or in response to detecting a series of popcorn noise followed by silence/low noise. The environment sensors 246 can include a pressure sensor, a humidity sensor, a smoke sensor, a pollutant sensor, or any combination thereof. The computing device 206 can also utilize the outputs of the environment sensors 246 as dynamic feedback to adjust the controls of the heating elements 218 in real-time according to a heating sequence instruction (e.g., a heat adjustment algorithm).

In some embodiments, the cooking instrument 200 includes the chamber thermometer 250, and/or the temperature probe 254. For example, the computing device 206 can utilize the temperature readings from the chamber thermometer 250 as dynamic feedback to adjust the controls of the heating elements 218 in real-time according to a heat adjustment algorithm. The temperature probe 254 can be adapted to be inserted into food to be cooked by the cooking instrument 200. The computing device 206 can also utilize the outputs of the temperature probe 254 as dynamic feedback to adjust the controls of the heating elements 218 in real-time according to a heat adjustment algorithm. For example, the heat adjustment algorithm of a cooking recipe can dictate that the food should be heated at a preset temperature for a preset amount time according to the cooking recipe.

Figure 3:
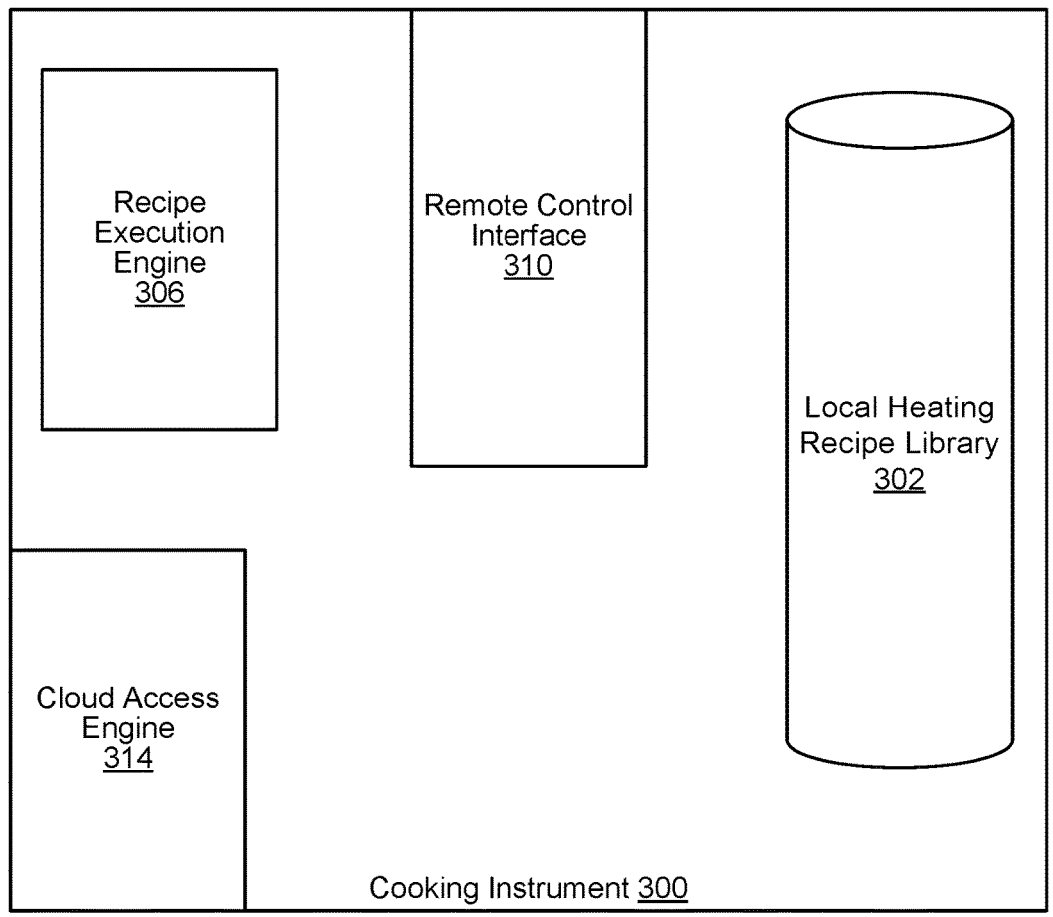
FIG. 3 is a block diagram illustrating functional components of a cooking instrument, in accordance with various embodiments.

FIG. 3 is a block diagram illustrating functional components of a cooking instrument 300 (e.g., the cooking instrument 100 and/or the cooking instrument 200), in accordance with various embodiments. For example, the functional components can run on the computing device 206 or one or more specialized circuits. For example, the cooking instrument 300 can implement at least a cooking recipe library 302, a recipe execution engine 306, a remote control interface 310, a cloud access engine 314, or any combination thereof. The cooking recipe library 302 stores one or more cooking recipes, each cooking recipe including one or more heating sequences respectively for one or more portions of food. The recipe execution engine 306 interprets the executable instructions from the cooking recipes and its heating sequences. The remote control interface 310 enables the functional components of the cooking instrument 300 to be controlled by an external user device (not shown). The remote control interface 310 can enable the external user device to configure the functional components of the cooking instrument 300 or to request information from the external user device. For example, the remote control interface 310 can connect with the external user device via the network interface 226. The cloud access engine 314 enables the cooking instrument 300 to communicate with a backend server system (not shown) to configure the functional components of the cooking instrument 300 or to request information from the backend server system.

In some examples, the recipe execution engine 306 can load and interpret a set of instructions to implement a cooking recipe, including executing a heating sequence (e.g., a dynamic segments, static segments, or any combination thereof). For example, the recipe execution engine 306 can analyze an image from a camera (e.g., the camera 222) to determine whether a door (e.g., the door 106) is open. For example, the image from the camera may be illuminated by a specific color of a specific light source (e.g., the light source 242) when facing toward an interior of the cooking instrument 300. In some examples, the recipe execution engine 306 is configured to analyze an image from the camera to determine whether a machine-readable optical label is within the image. For example, the recipe execution engine 306 can be configured to select a cooking recipe from the cooking recipe library 302 based on the machine-readable optical label. In this example, the remote control interface 310 is configured to send a message to an external user device to confirm the automatically selected cooking recipe. In some examples, the recipe execution engine 306 is configured to present the cooking recipe for confirmation on a local display and to receive the confirmation a local input component when the cooking recipe is displayed. In response to the selection of the cooking recipe, the recipe execution engine 306 can execute a heating sequence in accordance of the cooking recipe by controlling the heating elements. The heat adjustment algorithm is capable of dynamically controlling the heating elements 218 (e.g., adjusting output power, spectral power distribution, and/or peak wavelength(s)) in real-time in response to changing input variables (e.g., real-time sensor inputs, user inputs, external user device or backend server system provided parameters, or any combination thereof).

The remote control interface 310 can be used to interact with a user. For example, a user device (e.g., a computer or a mobile device) can connect to the remote control interface via the network interface 226. Via this connection, the user can configure the cooking instrument 300 in real-time. In one example, the user can select a cooking recipe via a user-device-side application running on the user device. The user-device-side application can communicate the remote control interface 310 to cause the cooking instrument 300 to execute the selected cooking recipe. The cloud access engine 314 can enable the cooking instrument 300 to access a cloud service to facilitate execution of a cooking recipe and/or update the cooking recipes in the cooking recipe library 302.

Components (e.g., physical or functional) associated with the cooking instrument (e.g., the cooking instrument 100, the cooking instrument 200, and/or the cooking instrument 300) can be implemented as devices, modules, circuitry, firmware, software, or other functional instructions. For example, the functional components can be implemented in the form of special-purpose circuitry, in the form of one or more appropriately programmed processors, a single board chip, a field programmable gate array, a network-capable computing device, a virtual machine, a cloud computing environment, or any combination thereof. For example, the functional components described can be implemented as instructions on a tangible storage memory capable of being executed by a processor or other integrated circuit chip. The tangible storage memory may be volatile or non-volatile memory. In some embodiments, the volatile memory may be considered "non-transitory" in the sense that it is not a transitory signal. Memory space and storages described in the figures can be implemented with the tangible storage memory as well, including volatile or non-volatile memory.

Each of the components may operate individually and independently of other components. Some or all of the components may be executed on the same host device or on separate devices. The separate devices can be coupled through one or more communication channels (e.g., wireless or wired channel) to coordinate their operations. Some or all of the components may be combined as one component. A single component may be divided into sub-components, each sub-component performing separate method step or method steps of the single component.

In some embodiments, at least some of the components share access to a memory space. For example, one component may access data accessed by or transformed by another component. The components may be considered "coupled" to one another if they share a physical connection or a virtual connection, directly or indirectly, allowing data accessed or modified by one component to be accessed in another component. In some embodiments, at least some of the components can be upgraded or modified remotely (e.g., by reconfiguring executable instructions that implements a portion of the functional components). The systems, engines, or devices described herein may include additional, fewer, or different components for various applications.

Figure 4:
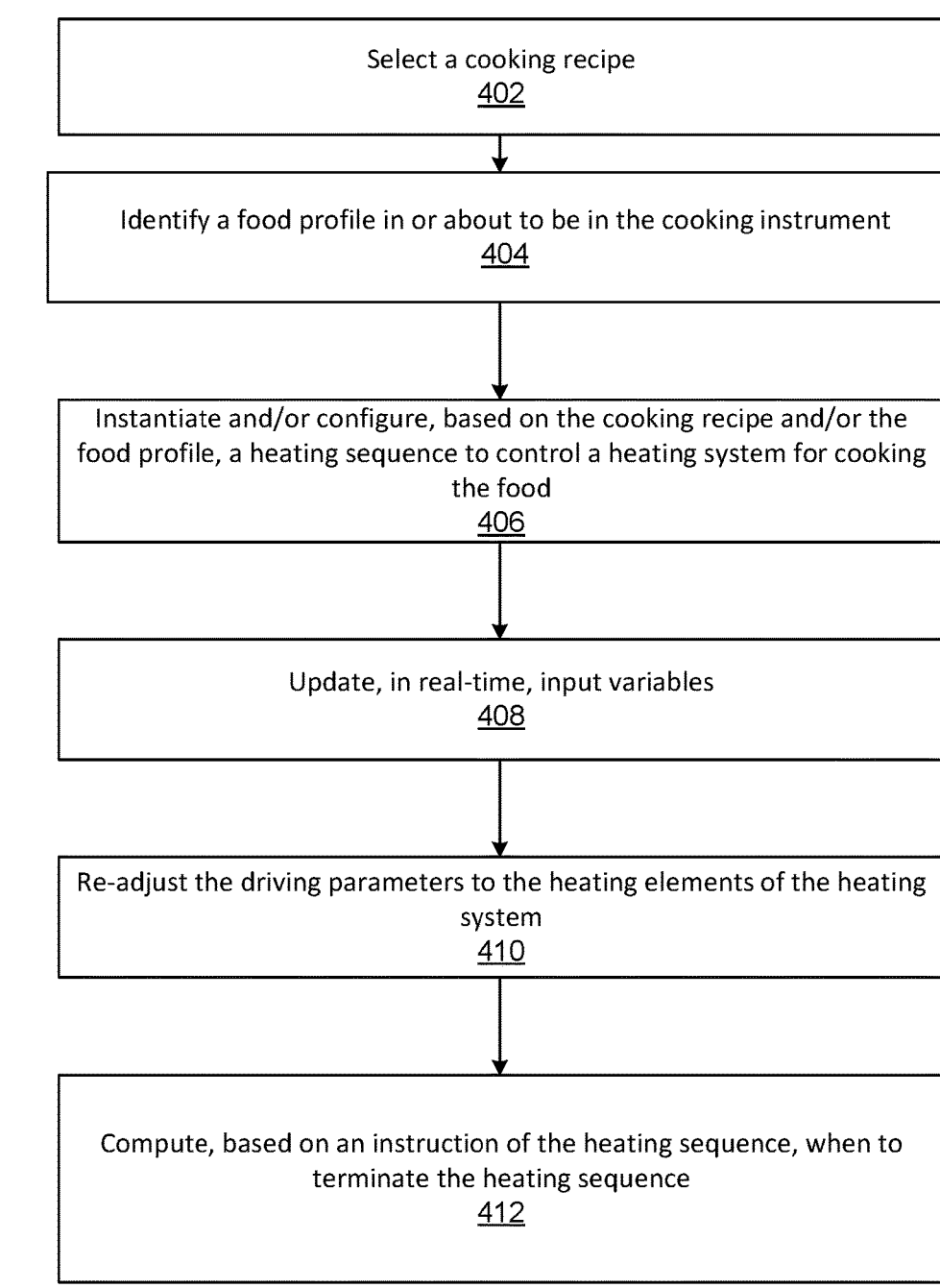
FIG. 4 is a flowchart illustrating a method of operating a cooking instrument to cook food, in accordance with various embodiments.

FIG. 4 is a flowchart illustrating a method 400 of operating the cooking instrument (e.g., the cooking instrument 100, the cooking instrument 200, and/or the cooking instrument 300) to cook food, in accordance with various embodiments. The method 400 can be controlled by a computing device (e.g., the computing device 206).

At step 402, the computing device can select a cooking recipe (e.g., from a local cooking recipe library stored in the local memory (e.g., the operational memory 210 and/or the persistent memory 214) of the computing device and/or the cooking instrument, in an external cooking recipe library implemented by a cloud service accessible through a network interface (e.g., the network interface 226), or in the memory of another external source connected to the computing device). Optionally, at step 404, the computing device can identify a food profile in or about to be in the cooking instrument. For example, the computing device can utilize a camera to identify the food profile (e.g., performing image recognition of the food or scanning a digital label attached to an outer package of the food). The food profile can identify the size of the food, the weight of the food, the shape of the food, the current temperature of the food, or any combination thereof.

At step 406, the computing device can instantiate and/or configure, based on the cooking recipe and/or the food profile, a heating sequence to control a heating system for cooking the food. The heating sequence can include one or more dynamic segments defined by a heat adjustment algorithm. The heat adjustment algorithm can specify how to adjust the driving parameters of one or more heating elements in the cooking instrument based on input variables that may change over time. Input variables can include time lapsed (e.g., time from when the heating elements are first driven and/or when the heating sequence first begins), temperature (e.g., detected by a temperature sensor in the cooking chamber or on the cooking platform) within the cooking instrument, user input (e.g., via an external device connected to the computing device or a control panel of the cooking instrument), temperature within the food (e.g., as reported by a temperature probe inserted into the food and communicatively coupled to the computing device), real-time or asynchronous image analysis of the food, real-time or asynchronous audio signal analysis from a microphone inside or outside of the cooking instrument, real-time or asynchronous environment sensor output analysis, other data received over a network, other data generated by a component of the cooking instrument, or any combination thereof. At step 408, the computing device can update, in real-time, the input variables and, at step 410, re-adjust the driving parameters to the heating elements of the heating system according to the heating sequence and/or the heat adjustment algorithm.

Part of the adjustment made by the heating sequence can include heat intensity, spectral power distribution and/or peak wavelength (e.g., for targeting different food or material within the cooking chamber), heat duration, target zone or cooking platform for heating, or any combination thereof. The computing device can configure the heating elements to apply different heating patterns to different zones (on the same cooking platform or different cooking platforms) in the cooking instrument. Each "zone" can be represented by an areas on a cooking platform or a portion of food resting on the cooking platform. The computing device can configure the heating elements to apply, simultaneously or sequentially, different heating patterns to different zones on the cooking platform by supplying different amount of power and/or emission spectral power distributions to different heating elements. The computing device can configure the heating elements to apply different heating patterns to different zones on the cooking platform by driving the heating elements of the heating system at varying peak wavelengths. The cooking instrument can include a perforated metallic sheet between the cooking platform and at least one of the heating elements. The computing device can configure the heating elements to apply different heating patterns to different zones on the cooking platform by using the perforated metallic sheet to spatially block portions of waves emitted by the at least one of the heating elements.

At step 412, the computing device can compute, based on at least an instruction in the heating sequence, when to terminate the heating sequence (e.g., when the cooking instrument stops supplying power to the heating elements). In some embodiments, the heating adjustment algorithm takes into account whether the food is expected to be extracted out of the cooking instrument substantially immediately after the termination of the heating process (e.g., a high-speed mode). For example, the heating adjustment algorithm can shorten the expected termination time if the user indicates that the food will remain in the cooking instrument a preset duration after the termination of the heating process (e.g., a low stress mode).

Figure 5A:
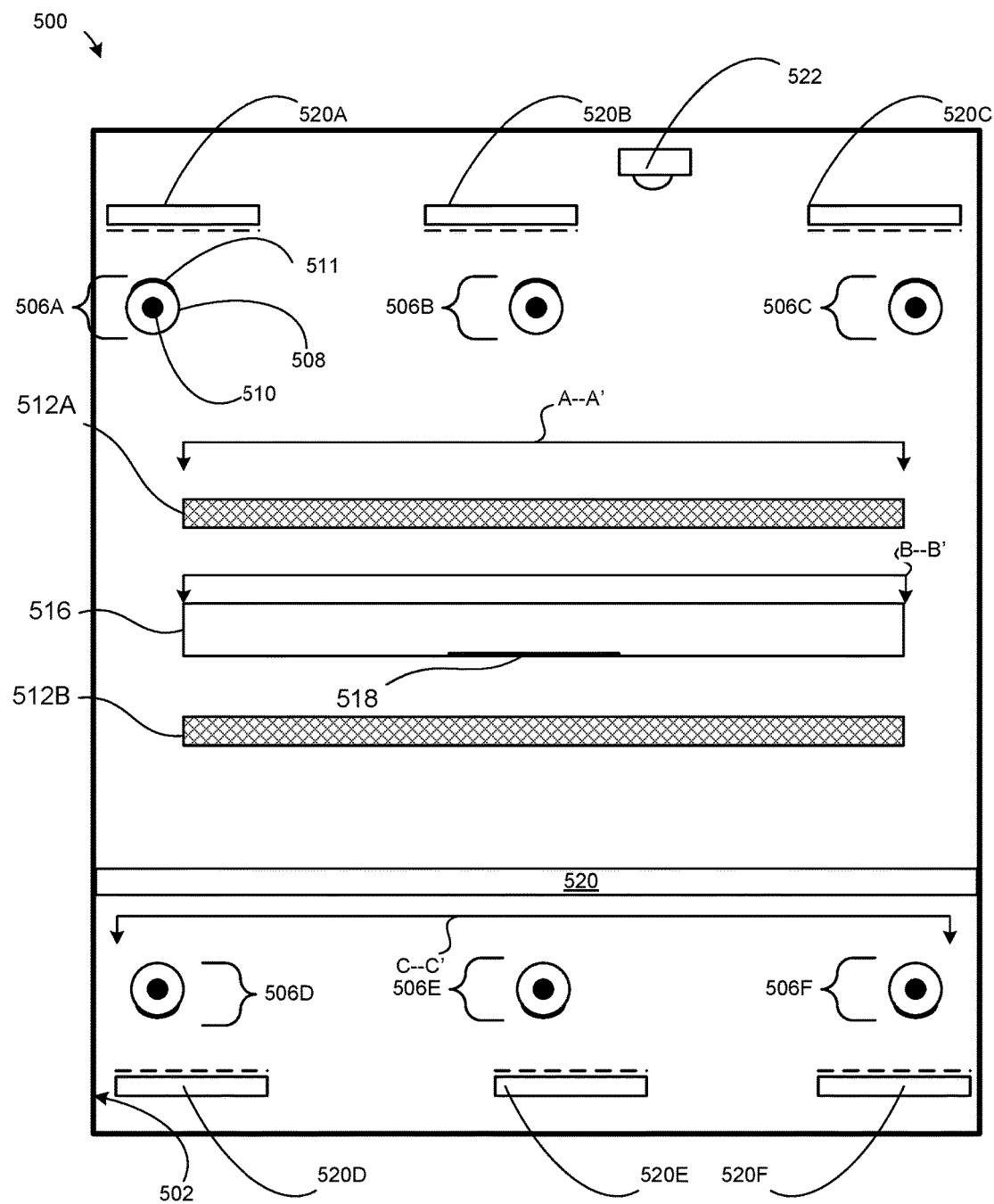
FIG. 5A is a cross-sectional front view of a first example of a cooking instrument, in accordance with various embodiments.

FIG. 5A is a cross-sectional front view of a first example of a cooking instrument 500 (e.g., the cooking instrument 100, the cooking instrument 200, and/or the cooking instrument 300), in accordance with various embodiments. The cooking instrument 500 includes a chamber 502 and a heating system (not labeled in FIG. 5A) with one or more filament assemblies 506 (e.g., a filament assembly 506A, a filament assembly 506B, a filament assembly 506C, a filament assembly 506D, a filament assembly 506E, a filament assembly 506F, etc., collectively as the "filament assemblies 506") at one or more locations in the chamber 502. The filament assemblies 506 can respectively be part of the heating elements of the cooking instrument 500. Each of the filament assemblies 506 can include a containment vessel 508 surrounding a filament 510. The containment vessel 508 can be coated with reflective material to serve as a reflector 511. This way, the reflector 511 is prevented from being fouled by debris. The containment vessel 508 can be made of quartz. The reflective material can be gold or white ceramics, such as zirconium oxide, silicon oxide, etc. The filament assemblies 506 can be tungsten halogen assemblies. The reflective material can be coated on a portion of an outer surface of each of filament assemblies 506 or the containment vessel 508 that faces away from a cooking platform 516. In some embodiments, the reflector 511 is a separate component than each of the filament assemblies 506 and the containment vessel 508. For example, each of the reflector 511 can be positioned adjacent to each of the filament assemblies 506 away from the center of the cooking chamber. In some embodiments, the reflector 511 is placed close enough to each of the filament assemblies 506 such that during normal operations (e.g., approximately 450 Fahrenheit or above), debris is burnt off between the corresponding reflector 511 and each of the filament assemblies 506. In some embodiments, at least one of the filament assemblies 506 is between the reflector 511 and a glass covering. In some embodiments, a glass covering is between at least one of the filament assemblies 506 and the reflector 511.

A computing device (e.g., the computing device 206) can be configured to control the emission spectral power distribution (e.g., including one or more peak emission wavelengths) of the filament assemblies 506, individually, in subsets, or as a whole. For example, the computing device can be configured to identify a food profile associated with food (e.g., in the chamber 502) based on sensor input (e.g., camera scanning a label) and/or the user input. The computing device can then determine one or more excitable wavelengths associated with the food profile. For example, the excitable wavelengths can correspond to resonant frequencies of the food material(s) associated with the food profile. The computing device can drive one or more (e.g., a single assembly up to all) of the filament assemblies 506 to emit at a peak emission wavelength corresponding to at least one of the excitable wavelengths to heat the food.

In some embodiments, the chamber 502 is entirely enclosed in metal. In some embodiments, the chamber 502 has the door. In some embodiments, the chamber 502 has one or more transparent windows (e.g., glass windows). In some embodiments, one or more perforated metal sheets 512 (e.g., a perforated metal sheet 512A and/or a perforated metal sheet 512B, collectively as the "perforated metal sheets 512") are disposed within the chamber 502. In some embodiments, there is only a single perforated metal sheet in the chamber 502 (e.g., above the cooking platform 516 or below the cooking platform 516). In some embodiments, there are two perforated metal sheets (as shown). Each of the perforated metal sheets 512 can be a removable or fixated panel. The perforated metal sheets 512 can enable control of heating concentration along a horizontal plane parallel its surface. Perforated metal sheets, such as a perforated aluminum foil, can be used to shield certain food items from the intense radiant heat generated by the filament assemblies 506. For example, when cooking a steak and vegetables side-by-side, the perforated metal sheets can shield the vegetables from being overcooked and enable the steak to receive the full power from the filament assemblies 506. Longer wavelength emission from the filament assemblies 506 can penetrate perforations more equally compared to shorter wavelength. Hence even if the perforations were designed to shield, for example, 90% of direct radiant heat, the cooking instrument can still independently tune the spatial concentration of the heating by varying the wavelength. This enables some control of side-by-side cooking in addition to direct radiant heating.

In some embodiments, the filament assemblies 506 are adapted to emit directional electromagnetic waves. Directionality of the emitted waves can enabled by the shape and/or location of the reflector 511, the structure, shape, and/or location of the containment vessel 508, the structure and/or shape of the filament 510, or any combination thereof. In some embodiments, the perforated metal sheets 512 further restricts the spatial concentration of the emitted waves. In some embodiments, at least some of the filament assemblies 506 are adapted to emit unidirectional electromagnetic waves.

In some embodiments, the chamber 502 includes the cooking platform 516 (e.g., the cooking platform 110) in the chamber 502. In some embodiments, the cooking platform 516 includes or is part of at least one of the one or more perforated metal sheets 512. The computing device can be configured to drive the filament assemblies 506 to emit at a spectral power distribution including a peak emission wavelength corresponding to excitable wavelength for the cooking platform 516. By tuning to include the peak emission wavelength to the excitable wavelength of the cooking platform 516, the computing device can heat up the cooking platform 516 without directly heating the air or the food inside the chamber 502.

The cooking platform 516 can be made of glass or metal. The cooking platform 516 can include an optically transparent region, such as via glass or glass-like material, enabling visible light to substantially travel through two opposing surfaces of the cooking platform 516. For example, prior to heating, a user of the cooking instrument 500 can place an instruction sheet beneath the cooking platform 516 while arranging food on the cooking platform 516 to be cooked. The user can directly overlay specific food at the desired location according to the instruction sheet. In some embodiments, the cooking platform 516 includes a reflective portion 518 to enable a top side camera 522 to capture a bottom view of food resting on the cooking platform 516.

In some embodiments, the cooking instrument 500 includes an airflow-based cooling system (e.g., including a cooling unit 520A, a cooling unit 520B, a cooling unit 520C, a cooling unit 520D, a cooling unit 520E, and a cooling unit 520F, collectively as the "cooling system 520"). The airflow-based cooling system 520 can blow directly onto a reflector portion of the containment vessel 508 to cool (e.g., prevent vaporization of the reflective coating) and/or improve performance of the reflector 511. The airflow can be controlled to provide impingement convection heating. The airflow-based cooling system 520 can have an air path that filters steam and thus prevents hot air from escaping when the door of the cooking instrument 500 is opened. The air path can also be configured to go over a camera (not shown) of the cooking instrument 500 to keep the lens of the camera condensation free.

In some embodiments, a fan can be installed away from the filament assemblies 506. When the spectral power distribution (including one or more peak wavelengths) of a filament assembly is configured to heat the envelope and/or the containment vessel 508, the fan can stir the air within the chamber 502 to ensure that heated air adjacent to the containment vessels 508 is moved to other parts of the chamber 502 to cook the food.

In some embodiments, the cooking instrument 500 lacks a crumb tray. Optionally, the cooking instrument 500 can use a heat resistant sheet 520 (e.g., quartz or other material) to cover the filament assemblies 506 so that the bottom of the cooking instrument chamber has no filament assemblies to trip over. The heat resistant sheet can be transparent at the operating wavelengths of the filament assemblies 506 to enable for the emission from the filament assemblies 506 to penetrate through without much loss.

In some embodiments, the computing device within the cooking instrument 500 can drive the filament assemblies 506 according to instructions in a cooking recipe. For example, the computing device can drive at least one of the filament assemblies 506 at a peak wavelength. The peak wavelength can correspond to excitable wavelengths of the materials in the cooking platform 516, the containment vessel 508 (e.g., envelope of the filament assembly), a specific type of edible material, water molecules, or any combination thereof. By matching a particular peak wavelength corresponding to an excitable wavelength of a target material, the computing device can target specific material for heating. For example, the computing device can drive at least one of the filament assemblies 506 at a peak wavelength (e.g., 3 μm or above for a glass cooking platform) such that the cooking platform 516 is substantially opaque to waves emitted from the at least one of the filament assemblies 506. The computing device can drive at least one of the filament assemblies 506 at a peak wavelength (e.g., 3 μm or less for glass cooking platforms) such that the cooking platform 516 is substantially transparent to waves emitted from the at least one of the filament assemblies 506. The computing device can drive at least one of the filament assemblies 506 at a peak wavelength (e.g., between 3 μm and 4 μm for glass cooking platforms) such that the cooking platform 516 is heated by waves emitted from the at least one of the filament assemblies 506 without heating any organic food in the cooking chamber.

Figure 5B:
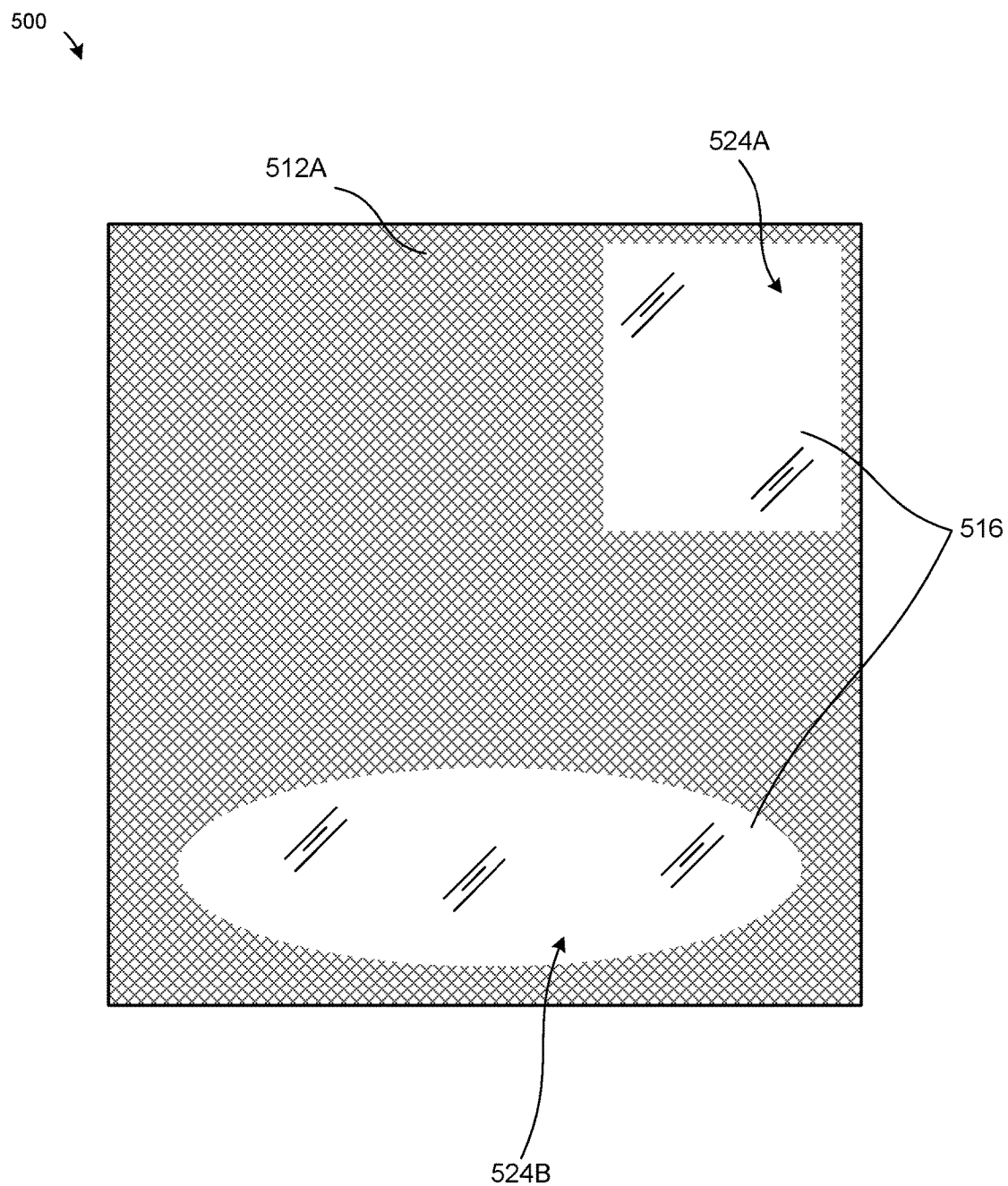
FIG. 5B is a cross-sectional top view of the cooking instrument of FIG. 5A along lines A-A', in accordance with various embodiments.

FIG. 5B is a cross-sectional top view of the cooking instrument 500 of FIG. 5A along lines A-A', in accordance with various embodiments. FIG. 5B can illustrate the perforated metal sheet 512A and cavities within the perforated metal sheet 512A that exposes the cooking platform 516. For example, the perforated metal sheet 512 includes a rectangular cavity 524A and an oval cavity 524B that exposes the cooking platform 516 underneath.

Figure 5C:
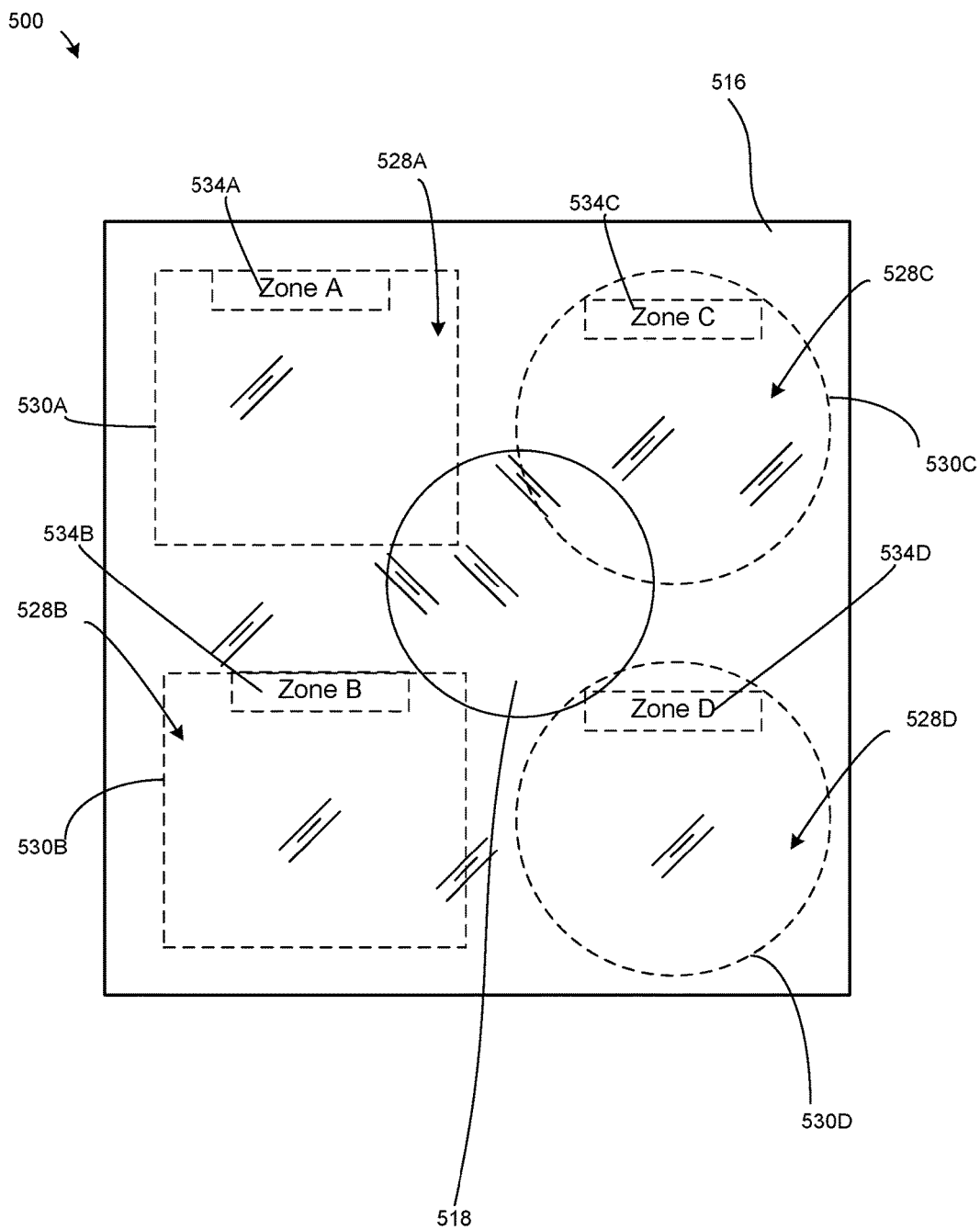
FIG. 5C is a cross-sectional top view of the cooking instrument of FIG. 5A along lines B-B', in accordance with various embodiments.

FIG. 5C is a cross-sectional top view of the cooking instrument 500 of FIG. 5A along lines B-B', in accordance with various embodiments. FIG. 5C can illustrate the cooking platform 516. In embodiments where the cooking platform 516 is transparent or semi-transparent, the reflective portion 518 may be visible from the cross-sectional top view.

In some embodiments, the cooking platform 516 can be virtually divided into cooking target zones (e.g., zone 528A, zone 528B, zone 528C, and zone 528D, collectively as the "cooking target zones 528"). That is, food cooking recipes and heating sequences can reference these cooking target zones 528. Each of the cooking target zones 528 can be defined by physically visible perimeters (e.g., a zone A perimeter 530A, a zone B perimeter 530B, a zone C perimeter 530C, and a zone D perimeter 530D, collectively as the "visible perimeters 530"). The visible perimeters 530 can be of different sizes and shapes (e.g., overall or rectangular). In some embodiments, the visible perimeters 530 can be marked by heat resistant paint. In some embodiments, the visible perimeters 530 can be defined by structural channeled edges or beveled edges in the cooking platform 516. In some embodiments, each of the visible perimeters 530 can be defined by the corresponding cooking target zone being terraced (e.g., elevated or depressed).

In some embodiments, the cooking target zones 528 can include visible labels (e.g., a zone A label 534A, a zone B label 534B, a zone C label 534C, and a zone D label 534D, collectively as the "visible labels 534"). The visible labels 534 can advantageously provide a clear reference for a user to know where to place portions of food as instructed by the cooking instrument 500 (e.g., via displayed information related to instructions associated with a cooking recipe).

Figure 5D:
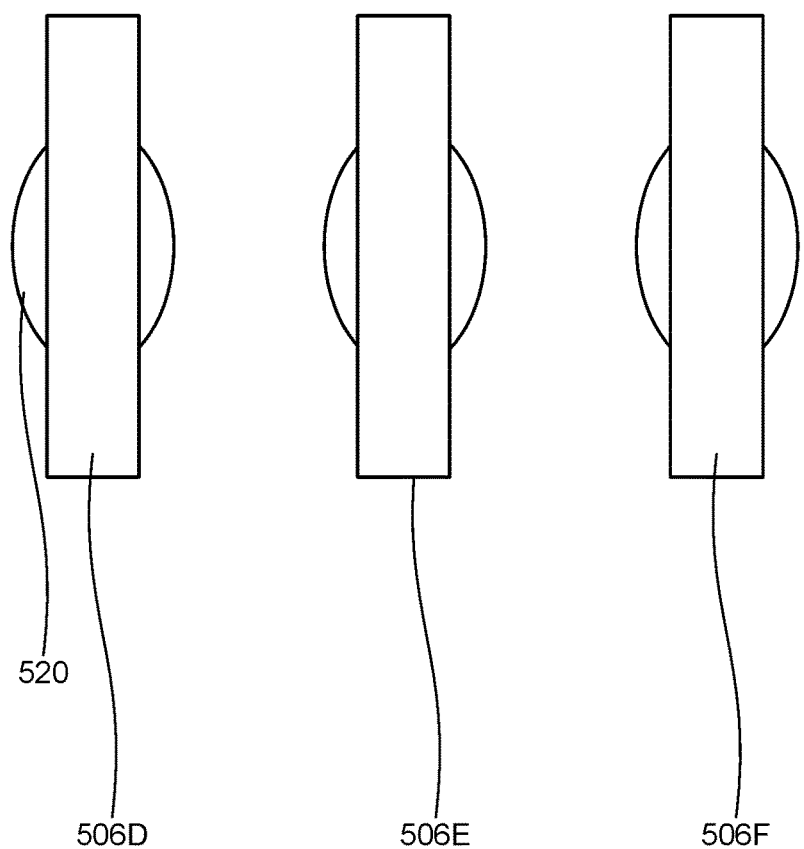
FIG. 5D is a cross-sectional top view of the cooking instrument of FIG. 5A along lines C-C', in accordance with various embodiments.

FIG. 5D is a cross-sectional top view of the cooking instrument 500 of FIG. 5A along lines C-C', in accordance with various embodiments. FIG. 5D can illustrate an example layout of the filament assemblies 506.

Figure 7:
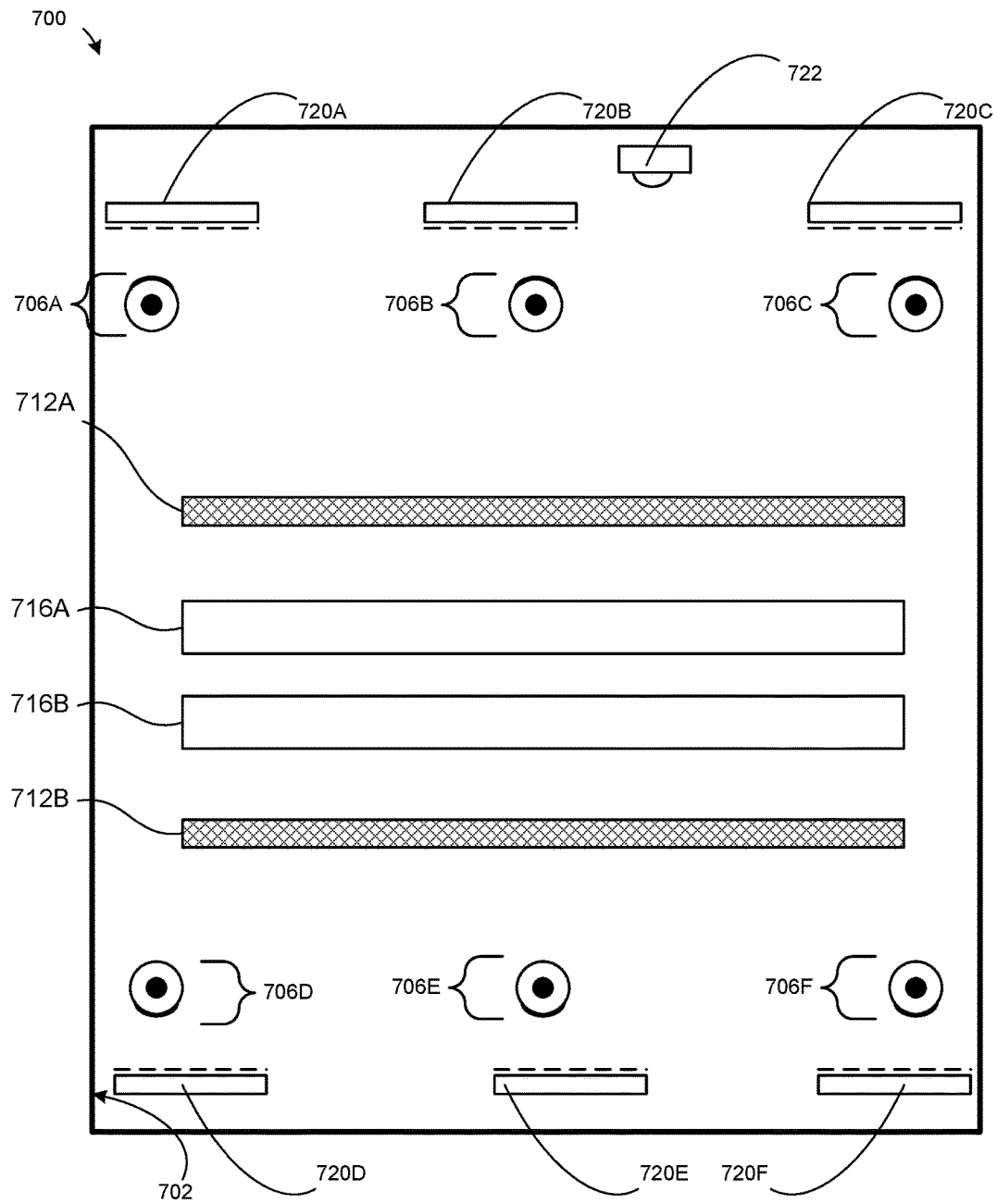
FIG. 7 is a cross-sectional front view of a second example of a cooking instrument, in accordance with various embodiments.

FIG. 7 is a cross-sectional front view of a second example of a cooking instrument 700 (e.g., the cooking instrument 100, the cooking instrument 200, and/or the cooking instrument 300), in accordance with various embodiments. The cooking instrument 700 is substantially similar to the cooking instrument 500 except for an additional cooking platform. The cooking instrument 700 includes a chamber 702 similar to the chamber 502, filament assemblies 706A-F similar to the filament assemblies 506A-F, a first perforated metal sheet 712A and a second perforated metal sheet 712B similar to the perforated metal sheets 512A-B, cooling units 720A-F similar to the cooling units 520A-F, and a camera 722 similar to the camera 522. The cooking instrument 700 includes a cooking platform 716A and a cooking platform 716B.

The cooking instrument 700 can virtually implement cooking target zones in both the cooking platform 716A and the cooking platform 716B. In some embodiments, the cooking instrument 700 is capable of driving the filament assemblies 706A-C to emit electromagnetic waves that passes through the cooking platform 716A and directly heat the cooking platform 716B. This can be achieved by driving the filament assemblies 706A-C at a spectral power distribution that the cooking platform 716A is transparent to and that the cooking platform 716B is opaque to. In some embodiments, the cooking instrument 700 is capable of driving the filament assemblies 706D-F to emit electromagnetic waves that passes through the cooking platform 716B and directly heat the cooking platform 716A. This can be achieved by driving the filament assemblies 706D-F at a spectral power distribution that the cooking platform 716B is transparent to and that the cooking platform 716A is opaque to.

In some embodiments, the cooking instrument 700 is capable of driving the filament assemblies 706A-C to emit electromagnetic waves that passes through the cooking platform 716A and heat portions of food in target cooking zones on the cooking platform 716B. This can be achieved by driving the filament assemblies 706A-C at a spectral power distribution that the cooking platform 716A is transparent to and that the portions of food is opaque to. In some embodiments, the cooking instrument 700 is capable of driving the filament assemblies 706D-F to emit electromagnetic waves that passes through the cooking platform 716B and directly heat portions of food in target cooking zones on the cooking platform 716A. This can be achieved by driving the filament assemblies 706D-F at a spectral power distribution that the cooking platform 716B is transparent to and that the portions of food is opaque to.

Figure 6:
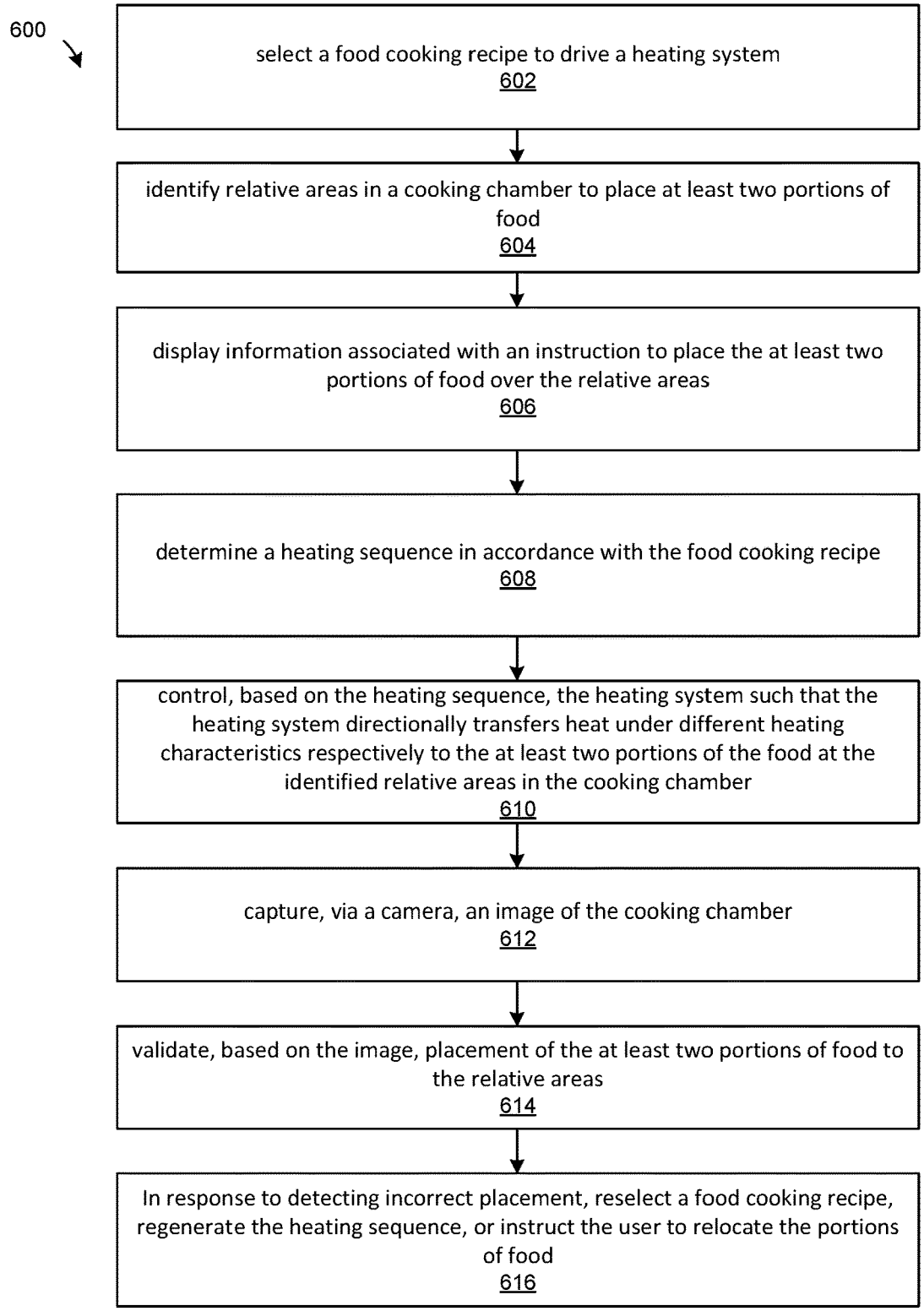
FIG. 6 is a flow chart illustrating a method of operating a cooking instrument, in accordance with various embodiments.

FIG. 6 is a flow chart illustrating a method 600 of operating a cooking instrument (e.g., the cooking instrument 100, the cooking instrument 200, and/or the cooking instrument 500), in accordance with various embodiments. The method 600 can be executed by a control system (e.g., the computing device 206) of the cooking instrument. At step 602, the cooking instrument selects a food cooking recipe to drive a heating system (e.g., the heating system 216) of the cooking instrument. The selection can be made based on a user indication, an external message, a sensor input, or any combination thereof. The cooking instrument can receive the user indication via an interactive display (e.g., the display 122 and/or the display 230) of the cooking instrument. The interactive display can be a touch screen or a display with buttons/dials for input. The cooking instrument can receive the user indication via a wireless or wired message from an external device in network communication with and separate from the cooking instrument. The cooking instrument can receive the user indication via a camera identifying an optical label or a type of food based on user placement.

At step 604, the cooking instrument can identify relative areas (e.g., the cooking target zones 528) in a cooking chamber to place at least two portions of food. The relative areas are associated with the selected food cooking recipe. Step 604 can either occur before or after step 602. In some embodiments, the cooking instrument identifies the relative areas based on the selected food cooking recipe. In some embodiments, the cooking instrument selects the food cooking recipe after identifying the relative areas to place the at least two portions of food. That is, regardless of the order of identifying the relative areas and selection of the food cooking recipe, the placement of the portions of food have to match the food cooking recipe. In some embodiments, the relative areas correspond to different cooking platforms lodged within the cooking chamber The at least two portions of food can be at least two different types of food. The at least two different types of food can have different heat transfer characteristics, specific heats, and/or resonate frequencies.

At step 606, the cooking instrument can display information associated with an instruction to place the at least two portions of food over the relative areas. The cooking instrument can display on an internal display device (e.g., the display 122 and/or the display 230) or an external display device (e.g., a mobile communication device in network communication with the cooking instrument). In one example, the information includes directly displaying the instruction showing the respective identifiers over the representations of the relative areas. In another example, the information includes a reference to where to obtain such instruction (e.g., to a paper copy of the instruction). Displaying such information can include rendering a virtual representation of the cooking chamber. Displaying such information can include rendering a virtual representation of a cooking platform in the cooking chamber. Displaying such information can include rendering an animation demonstrating placement of the at least two portions of food respectively in the relative areas.

The representations of the relative areas can include symbolic identifiers that are also physically embodied on at least one cooking platform (e.g., the cooking platform 110 and/or the cooking platform 516) in the cooking chamber. The cooking platform can be a removable cooking platform. In some embodiments, the relative areas can respectively correspond to different areas on a cooking platform in the cooking chamber. These different areas can be immediately adjacent to and in contact with one another or spaced apart from one another with at least another area/zone there between. In some embodiments, the relative areas are respectively placed on different cooking platforms in the cooking chamber. In some embodiments, the different cooking platforms are composed of different material such that under certain emission spectral configuration (e.g., emission spectral power distribution) of at least part of the heating system, waves emitted from the heating system can pass through at least one of the cooking platform without passing through another part of the cooking platform.

At step 608, the cooking instrument can determine a heating sequence in accordance with the food cooking recipe. The heating sequence is the basis for driving the heating system of the cooking instrument. In some embodiments, the heating sequence is determined dynamically based on sensor input. For example, the food cooking recipe may dictate a certain amount of browning on a first portion of food. The cooking instrument thus can utilize a camera or a photodetector to obtain a continuous stream of images or light reading to determine the browning level of the first portion of food. Based on the browning level, the cooking instrument can dynamically adjust the heating sequence. In another example, the food cooking recipe may dictate brining a second portion of food to boil. The cooking instrument thus can utilize a camera to obtain a continuous stream of images to determine whether the second portion of food has boiled. Based on the determination, the cooking instrument can dynamically adjust the heating sequence.

At step 610, the cooking instrument controls, based on the heating sequence, the heating system such that the heating system directionally transfers heat under different heating characteristics respectively to the at least two portions of the food at the identified relative areas in the cooking chamber. For some heating sequences, the cooking instrument controls the heating system by cyclically rotating through, in sequence, directionally heating a first portion of the food and directionally heating a second portion of the food. For some heating sequences, the cooking instrument controls the heating system by simultaneously transferring heat respectively to the at least two portions of the food under the different heating characteristics. That is, the cooking instrument can cook the at least two portions of food in the corresponding relative areas at the same time. In some embodiments, the cooking instrument can finish cooking in the at least two portions of food in the corresponding relative areas at the same time.

The directional transfer of heat can be done directly or indirectly. In one example, the heating system can directionally transfer heat directly by configuring an emission spectrum that corresponds to the resonant frequency of the target portion of food and directing such emission toward the target portion of the food. In another example, the heating system can directionally transfer heat by heating a specific cooking platform or a specific portion of a specific cooking platform that the target portion of food is on. The heating system can select a specific cooking platform by configuring its emission spectrum to correspond to the resonant frequency of the specific cooking platform. The heating system can select a specific portion of the specific cooking platform by leveraging the spatial directionality of a heating element in the heating system.

In some examples, controlling the heating system includes controlling a first heating element to emit first wireless electromagnetic waves (e.g., electromagnetic energy) toward a first area on a first cooking platform and a second heating element to emit second wireless electromagnetic waves toward a second area on a second cooking platform. The cooking instrument can drive the first heating element and the second heating element such that the first wireless electromagnetic waves have a first heating characteristic and the second wireless electromagnetic waves have a second heating characteristic. In some embodiments, the second cooking platform can be composed of a material that is substantially transparent to the second wireless electromagnetic waves. This way, even if the second wireless electromagnetic waves are emitted from a heating element of the heating system that is underneath the second cooking platform, the second wireless electromagnetic waves can still pass through the second cooking platform to directly heat a second portion of food (e.g., at the second area) on the second cooking platform.

The different heating characteristics can include different heating intensities, different heating durations, different heating cycles, different target materials, or any combination thereof. A heating cycle is a pattern of cyclically varying heating characteristics during the heating sequence. In some embodiments, target heating material is varied by varying emission spectral power distribution from the heating system.

In some embodiments, at step 612, the cooking instrument captures, via a camera (e.g., the camera 118 and/or the camera 222), an image of the cooking chamber. In these embodiments, at step 614, the cooking instrument validates, based on the image, placement of the at least two portions of food to the relative areas. The cooking instrument can detect incorrect placement of the portions of food (e.g., utilizing a camera and image analysis). In response to detecting the incorrect placement, at step 616, the cooking instrument can reselect a food cooking recipe, regenerate the heating sequence, or instruct the user to relocate the portions of food.

While processes or methods are presented in a given order, alternative embodiments may perform routines having steps, or employ systems having blocks, in a different order, and some processes or blocks may be deleted, moved, added, subdivided, combined, and/or modified to provide alternative or sub-combinations. Each of these processes or blocks may be implemented in a variety of different ways.

In addition, while processes or blocks are at times shown as being performed in series, these processes or blocks may instead be performed in parallel, or may be performed at different times. When a process or step is "based on" a value or a computation, the process or step should be interpreted as based at least on that value or that computation.

Some embodiments of the disclosure have other aspects, elements, features, and steps in addition to or in place of what is described above. These potential additions and replacements are described throughout the rest of the specification. Reference in this specification to "various embodiments" or "some embodiments" means that a particular feature, structure, or characteristic described in connection with the embodiment is included in at least one embodiment of the disclosure. Alternative embodiments (e.g., referenced as "other embodiments") are not mutually exclusive of other embodiments. Moreover, various features are described which may be exhibited by some embodiments and not by others. Similarly, various requirements are described which may be requirements for some embodiments but not other embodiments.

Some embodiments of the disclosure have other aspects, elements, features, and steps in addition to or in place of what is described above. These potential additions and replacements are described throughout the rest of the specification.

The invention claimed is:

1. A method of operating a cooking instrument, comprising:
   selecting, based on a user indication, an external message, or a sensor input, a food cooking recipe;
   identifying relative areas in a cooking chamber to place at least two portions of food, wherein the identified relative areas are associated with the selected food cooking recipe;
   displaying information including or referencing an instruction to place the at least two portions of food over the identified relative areas;
   determining a heating sequence in accordance with the food cooking recipe; and
   controlling, based on the heating sequence, a heating system of the cooking instrument such that the heating system directionally transfers heat under different heating characteristics respectively to the at least two portions of the food at the identified relative areas in the cooking chamber.

2. The method of claim 1, wherein the different heating characteristics include different heating intensities, different heating durations, different heating cycles, different target materials, or any combination thereof.

3. The method of claim 1, wherein said displaying the information includes displaying a reference to a paper copy of the instruction.

4. The method of claim 1, wherein said controlling the heating system includes rotating through, in sequence, directionally heating a first portion of the food and directionally heating a second portion of the food.

5. The method of claim 1, wherein said controlling the heating system includes simultaneously transferring heat respectively to the at least two portions of the food under the different heating characteristics.

6. The method of claim 1, wherein said displaying includes displaying symbolic identifiers representative of the relative areas; and wherein the symbolic identifiers are also physically embodied on at least one cooking platform in the cooking chamber.

7. The method of claim 1, wherein the relative areas respectively correspond to different areas on a cooking platform in the cooking chamber.

8. The method of claim 7, wherein the relative areas are immediately adjacent to and in contact with one another.

9. The method of claim 1, wherein the relative areas are respectively placed on different cooking platforms in the cooking chamber.

10. The method of claim 9, wherein the different cooking platforms are composed of different material.

11. The method of claim 1, wherein said displaying includes rendering a virtual representation of a cooking platform in the cooking chamber.

12. The method of claim 1, wherein said displaying includes rendering an animation demonstrating placement of the at least two portions of food respectively in the relative areas.

13. The method of claim 1, further comprising:
    capturing, via a camera of the cooking instrument, an image of the cooking chamber;
    determining, based on the image, an incorrect placement of the at least two portions of food to the relative areas; and
    in response to detecting the incorrect placement, reselecting a food cooking recipe, regenerating the heating sequence, or displaying an instruction to relocate the at least two portions of food.

14. A method of operating a cooking instrument, comprising
    selecting, based on a user indication, an external message, or a sensor input, a food cooking recipe;
    identifying, based on the selected food cooking recipe, relative areas in a cooking chamber to place at least two portions of food, wherein the relative areas correspond to different cooking platforms lodged within the cooking chamber;
    displaying respective identifiers of the at least two portions of food over representations of the relative areas;
    determining a heating sequence in accordance with the food cooking recipe; and
    controlling, based on the heating sequence, a heating system of the cooking instrument such that the heating system directionally transfers heat under different heating characteristics respectively to the at least two portions of the food at the identified relative areas in the cooking chamber.

15. The method of claim 14, wherein said controlling the heating system includes controlling a first heating element to emit first wireless electromagnetic waves toward a first area on a first cooking platform and a second heating element to emit second wireless electromagnetic waves toward a second area on a second cooking platform, wherein the heating system is configured such that the first wireless electromagnetic waves have a first heating characteristic and the second wireless electromagnetic waves have a second heating characteristic.

16. The method of claim 15, wherein the second cooking platform is composed of a material that is substantially transparent to the second wireless electromagnetic waves.

17. A cooking instrument, comprising
    a cooking chamber;
    a cooking platform in the cooking chamber, the cooking platform adapted to hold food;
    a heating system;
    a control system configured to:
        select, based on a user indication, an external message, or a sensor input, a food cooking recipe;

identify relative areas in a cooking chamber to place at least two portions of food, wherein the identified relative areas are associated with the selected food cooking recipe;

display information including or referencing an instruction to place the at least two portions of food over the identified relative areas;

determine a heating sequence in accordance with the food cooking recipe; and control, based on the heating sequence, the heating system such that the heating system directionally transfers heat under different heating characteristics respectively to the at least two portions of the food at the identified relative areas in the cooking chamber.

18. The cooking instrument of claim 17, further comprising a display device; wherein the control system is configured to display the information on the display device.

19. The cooking instrument of claim 18, wherein display device is a touch screen, and wherein the control system is further configured to confirm placement of the at least two portions at the relative areas on the cooking platform such that the heating sequence is configured to heat the at least two portions of food at the confirmed relative areas during at least a segment of the heating sequence.

20. The cooking instrument of claim 17, wherein, based on the heating sequence, the heating system is configured by the control system to emit electromagnetic waves at a given time segment such that the electromagnetic waves substantially heat a first portion of the food without substantially heating a second portion of the food.

21. The cooking instrument of claim 17, wherein the heating system comprises an envelope and a filament within the envelope.

22. The cooking instrument of claim 17, wherein the envelope is a quartz envelope.

* * * * *